United States Patent [19]

Larson

[11] Patent Number: 4,591,781
[45] Date of Patent: May 27, 1986

[54] VARIABLE CONTROL CIRCUIT HAVING A PREDETERMINED TIMED OUTPUT

[75] Inventor: Ray E. Larson, Fort Worth, Tex.

[73] Assignee: Power Controls Corporation, San Antonio, Tex.

[21] Appl. No.: 501,027

[22] Filed: Jun. 6, 1983

[51] Int. Cl.⁴ .............................................. G05F 3/04
[52] U.S. Cl. ..................................... 323/323; 307/141
[58] Field of Search ............... 323/322, 323, 324, 325, 323/326; 315/360; 361/196; 307/141, 141.4, 141.8, 592, 593, 600, 253, 590; 219/492, 507

[56] References Cited

U.S. PATENT DOCUMENTS

| | | | |
|---|---|---|---|
| 3,157,798 | 11/1964 | Anderson et al. | 307/353 |
| 3,517,222 | 6/1970 | Wallentowitz | 307/592 |
| 3,555,308 | 1/1971 | Peterson | 307/593 |
| 3,940,660 | 2/1976 | Edwards | 361/196 |
| 4,041,267 | 8/1977 | Wechsler | 323/323 |
| 4,121,149 | 10/1978 | Seltzer | 323/323 |
| 4,204,128 | 5/1980 | Kruper | 307/141 |
| 4,389,599 | 6/1983 | Jabor | 307/141 |
| 4,494,012 | 1/1985 | Coker | 307/141 |

OTHER PUBLICATIONS

Vestu, "7PU20-The New Electronic Time Relay," Siemens Power Eng. Product News 1, p. 11 (Dec. 1981).

Primary Examiner—William H. Beha, Jr.
Attorney, Agent, or Firm—Gunn, Lee & Jackson

[57] ABSTRACT

A circuit for varying the current to a load and, simultaneously, limiting the output of the load to a predetermined time interval. A timer chip having an RC network receives rectified current from an AC voltage source and responds thereto with a high output, which is used to bias an NPN transistor. The transistor permits the flow of rectified current to a logic triac, thereby triggering the logic triac and enabling current from the AC voltage source to flow to a variable resistor in series connection with a gating/AC timing capacitor, thereby triggering a diac. The diac responds to the controlled current flow from the variable resistor by operating the gate of a power control triac and permitting the desired current flow between the load and the AC voltage source through the power control triac. When the output of the timer chip is low at the end of the predetermined time interval, the logic triac prohibits the flow of current to the diac, thereby prohibiting the flow of current to the load across the power control triac.

11 Claims, 4 Drawing Figures

VARIABLE CONTROL CIRCUIT HAVING A PREDETERMINED TIMED OUTPUT

BACKGROUND OF THE INVENTION

It is often preferable to enable a load user to choose and control the output (speed, intensity, etc.) of a load capable of a variable output, and at the same time limit the chosen output to a predetermined time interval. It is also often preferable that the time interval be fixed and out of the control of the load user. For example, the manufacturer of a vibrating bed may want to allow the customer to control the speed of the vibrator motor, but limit the desired output to a fixed time interval. Such a circuit essentially provides automatic timed turn off of the vibrator motor, and allows the customer to fall asleep without being concerned that the motor will run indefinitely. A hotel owner may also want to allow guests to control the intensity of a bathroom heater lamp, but limit operation of the lamp to a fixed, predetermined time period, thereby reducing energy expenses. Energy costs may also be reduced in public restrooms wherein the chosen light intensity is limited to a fixed, predetermined time interval. These energy benefits are achieved in the present invention by requiring that the load be reset at the termination of the fixed time interval in order to operate the load beyond the predetermined time limits. The invention circuit can also be utilized to control a timed hot plate or coffee maker and/or the water pressure solenoid valves in a car wash. Despite these beneficial applications, however, no previous known circuits have combined the simultaneous control of a variable output with fixed, predetermined timer limitations in a unitary circuit board.

The present invention provides a variable output control circuit wherein the chosen output is limited to a fixed, predetermined time interval and whereby the above described benefits can be achieved in a unitary circuit board. A timer chip having an RC network receives rectified current from an AC voltage source and, in response thereto, provides a high output for a fixed, predetermined time interval, thereby biasing an NPN transistor for the duration of the time interval. The biased transistor permits the flow of rectified current to a logic triac, thereby triggering the gate of the logic triac and permitting current flow from the AC voltage source to a variable resistor in series connection with a gating/AC timing capacitor, the controlled current thereby triggering a trigger diode or diac. The diac responds to the controlled current from the variable resistor by triggering a power control triac, the power control triac thereby permitting the desired flow of current between the AC voltage source and load through its terminals. At the termination of the fixed time interval, the timer chip output becomes low and ceases to bias the NPN transistor, thereby prohibiting the activation of the logic triac and the flow of current from the AC voltage source to the variable resistor and diac. The diac will likewise cease to trigger the power control triac, thereby prohibiting the flow of current between the AC voltage source and the AC load. As such, the desired flow of current to the load as determined by external input to the variable resistor and the corresponding output will only continue for the duration of the fixed, predetermined time interval.

BRIEF DESCRIPTION OF THE PRIOR ART

Circuits for controlling the output of inductive or resistive loads which are capable of a variable output are generally known in the electronics art. These circuits enable the load user to control, for example, the speed of a motor or the intensity of an incandescent lamp. These circuits also enable the load user to obtain the desired output for as long as power is available for the load.

The assignee of the present invention is the owner of U.S. Pat. Nos. 3,990,033; 4,085,399; 4,259,619; and 4,334,171. All of these patents disclose variable control circuits and switches designed primarily for use with resistive loads, such as the dimming of an incandescent light. The assignee of the present invention is also the owner of U.S. Pat. No. 4,350,944, which patent discloses a variable control circuit for an inductive load, such as a motor. U.S. Pat. No. 4,350,944 also discloses a bridge rectifier circuit that permits the load to obtain maximum power for a predetermined time period. Nevertheless, load output in all of the above described circuits is basically controlled by varying the power (current and voltage) to the load.

Circuits for limiting the output of a load having a fixed output to a predetermined time interval are also generally known in the electronics art. These circuits typically comprise a mechanical timer which asserts direct control over the voltage source and only permits the delivery of fixed power to a load for the duration of a predetermined time interval. That is, the load is either "on" (full power) or "off" (no power) and only remains "on" for the duration of the time interval. However, no known circuits achieve the benefits discussed hereinabove by providing a unitary circuit which enables a load user to control the output of a variable output inductive or resistive load while simultaneously limiting the desired output to a fixed, predetermined time interval.

SUMMARY OF THE INVENTION

It is a primary object of the present invention to provide a circuit for varying the current flowing to a load and, simultaneously, limiting the chosen output to a fixed, predetermined time interval.

It is another object of the present invention to provide a circuit wherein the current flowing to a load can be independently controlled regardless of the fixed, predetermined time interval during which the output is permitted.

It is still another object of the present invention to provide a circuit for controlling the current flow to a resistive or inductive load and, simultaneously, limiting the chosen output to a fixed, predetermined time interval.

It is a further object of the present invention to provide a single circuit board wherein load output control is combined with a fixed or variable time interval limitation.

It is still a further object of the present invention to provide a circuit for varying current flow to a plurality of loads and simultaneously limiting the output of each load to a predetermined time interval.

These and other objects are achieved in the present invention by providing a single circuit wherein the current flow to a resistive or inductive load can be limited to a fixed, predetermined time interval. The circuit between an AC voltage source and the load is completed by a mechanical or solid state switch, which switch also reinitiates the predetermined time interval. The switch may be designed to permit an instantaneous reset or a delayed reset requiring an off period between outputs. When the circuit is completed, current from the AC voltage source is rectified and thereafter received by a timer chip or integrated circuit having an external RC network. The timer chip provides a high output in response to the rectified current for a fixed, predetermined time interval, the duration of which is based upon the RC network utilized in the timer chip.

Although it is preferable that the predetermined time interval be fixed, the RC network utilized may also be designed to permit the duration of the time interval to be varied by the load user. The timer chip output biases an NPN transistor, thereby permitting rectified current to trigger the gate of a logic triac for the duration of the time interval. The logic triac is connected between the AC voltage source and the variable control portion of the circuit. When the logic triac is activated, current from the AC voltage source is permitted to flow through the logic triac terminals to the variable control portion of the circuit. A variable resistor in series connection with a gating/AC timing capacitor permits controlled current flow from the AC voltage source through the logic triac terminals to a trigger diode or diac. The variable resistor receives external input from the load user and controls the charging current to the capacitor; when the diac breaks over, the capacitor discharges through the diac and supplies the current for a triac gate. Thus, when the capacitor has built up sufficient voltage, the diac fires and operates or triggers the gate of a power control triac connected between the AC voltage source and AC load, thereby permitting the desired flow of current between the AC voltage source and the load through the power control triac terminals. Infinite output control is thereby determined by the point at which the power control triac is triggered. The power control triac will continue to permit the desired flow of current through its terminals to the load only for the duration of the predetermined time interval; the flow of controlled current to the diac and the corresponding operation of the power control triac will cease when the output of the timer chip becomes low, the NPN transistor is no longer biased, and the logic triac is no longer activated. The time interval can be reinitiated if, and only if, the circuit is broken by the mechanical switch and then recompleted. The invention circuit permitting variable current flow to a single resistive or inductive load can also be readily modified to incorporate a plurality of resistive and/or inductive loads, each having an output limited to a predetermined time interval. The invention circuit thereby permits independent load output control for a fixed, predetermined time interval by simultaneously limiting the variable current flow to the duration of the fixed time interval.

DETAILED DESCRIPTION OF THE PREFERRED EMBODIMENT

Figure 1:
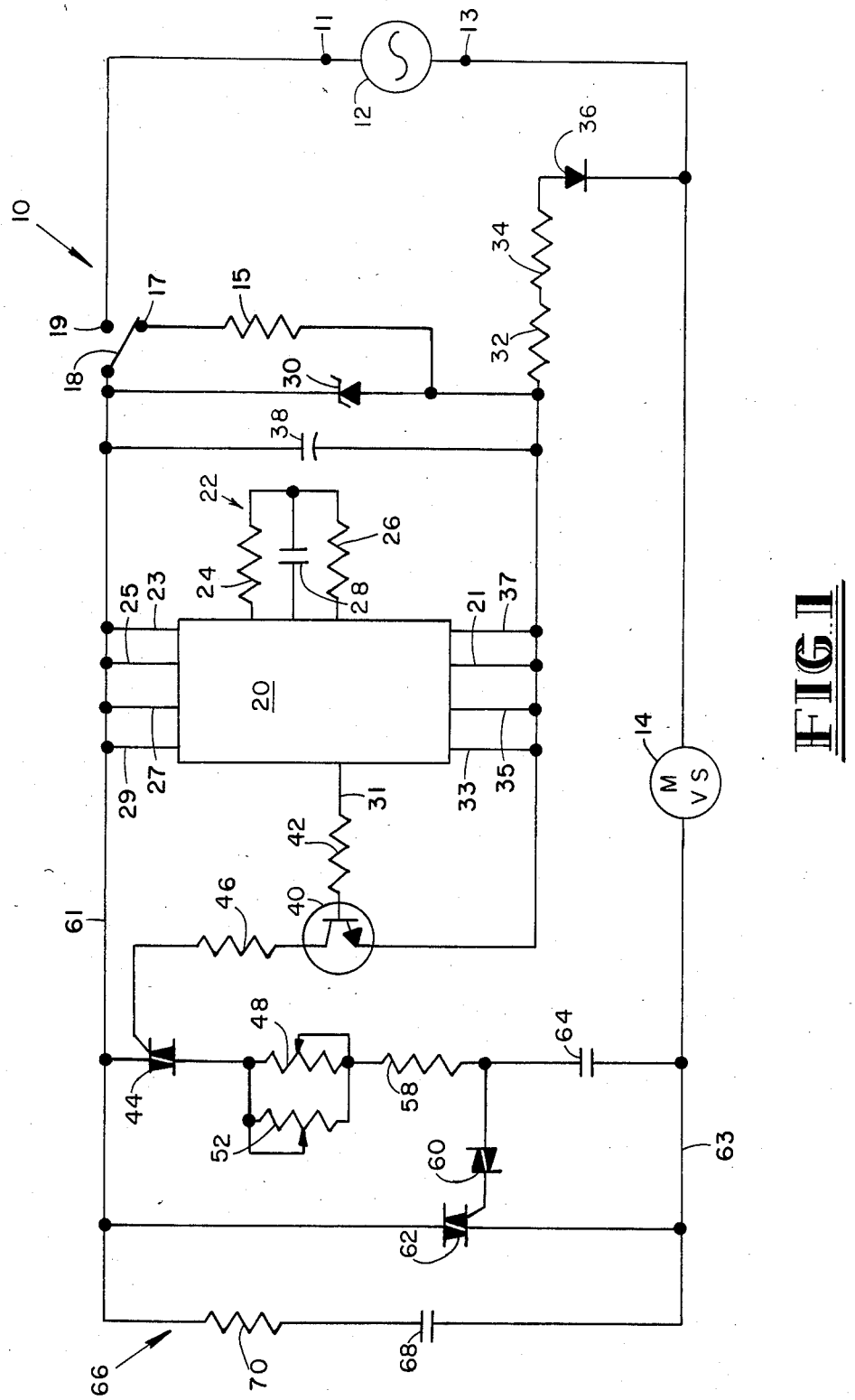
FIG. 1 is a schematic circuit diagram of a variable control circuit as utilized with a variable speed motor further having a predetermined timed output.
Figure 2:
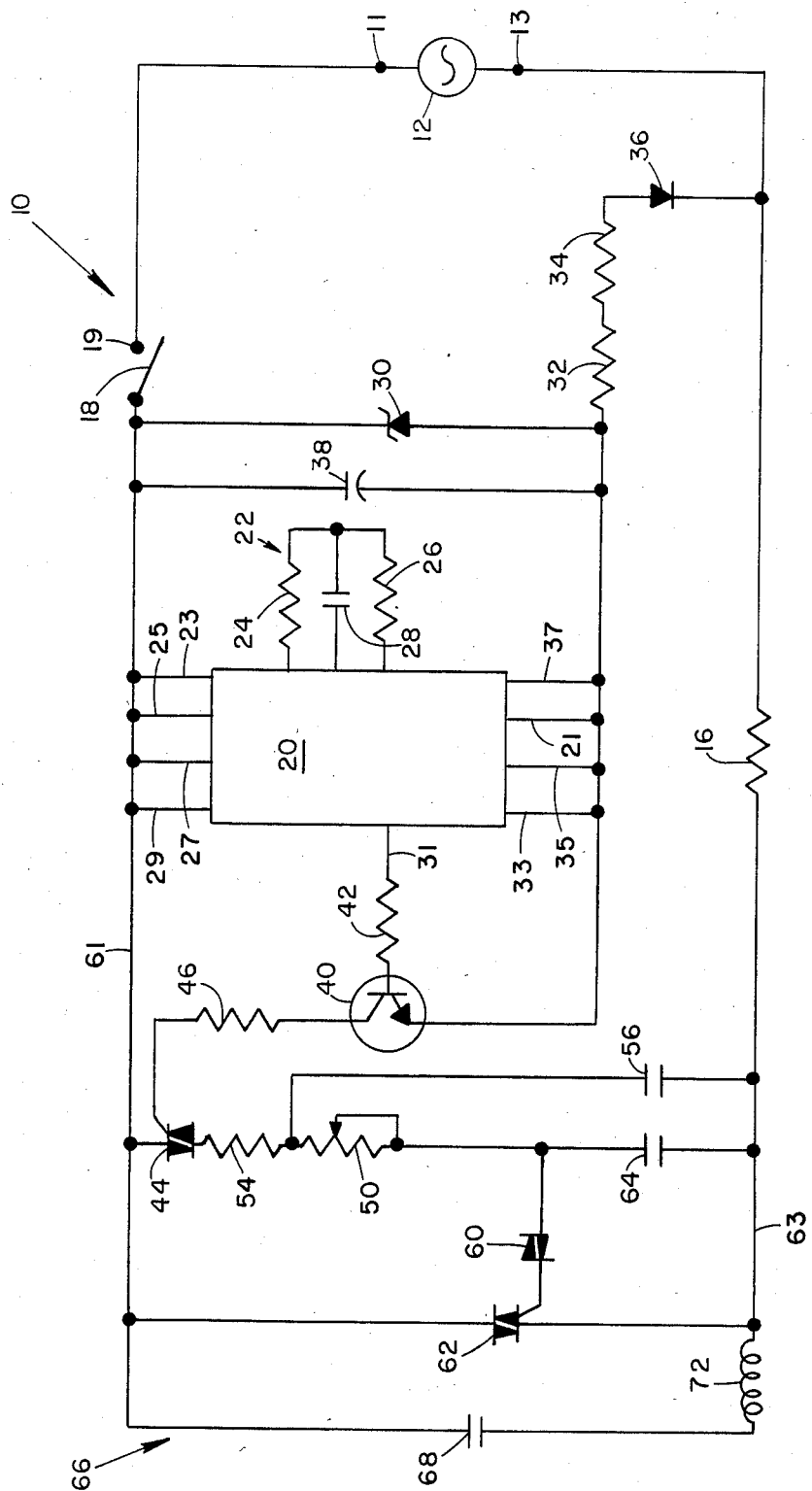
FIG. 2 is a schematic circuit diagram of a variable control circuit as utilized with an incandescent lamp or heater element further having a predetermined timed output.

Referring to FIG. 1 and FIG. 2, a variable control circuit having a predetermined timed output is identified by the numeral 10. An AC voltage source 12 is connected across input terminals 11 and 13 and provides power to AC loads 14 or 16. It is to be understood that the particular AC load utilized in the invention circuit may be an inductive load, such as a variable speed motor 14, or a resistive load, such as an incandescent lamp or heater element 16. The circuit illustrated in FIG. 1 will preferably be utilized when infinite control of motor speed along with automatic timed motor shut down is desired. When infinite control of intensity along with automatic timed turn off is desired, the modified circuit illustrated in FIG. 2 will preferably be utilized. As a result, only minor modifications are necessary to adapt the invention circuit to a particular load. The circuit 10 between the AC voltage source 12 and AC load 14 or 16 is completed by a mechanical or solid state switch 18. As explained more fully hereinbelow, switch 18 also initiates and resets the predetermined time interval.

The circuit 10 is provided with a timer chip 20 having an external RC network 22 for establishing the predetermined time interval during which output is obtained. Timer chip 20 is a standard integrated circuit that may be purchased commercially. The timer chip manufactured by Motorola having the reference code MC14541BCP is a typical example. RC network 22 comprises resistors 24 and 26 and a capacitor 28. The timer chip 20 is connected to the circuit 10 by power supply leads or wires 21 and 23, stage leads 25, 27, 29, and output lead or wire 31. The timer chip 20 is also provided with automatic reset leads 33, 35, and 37. When rectified current is received by the timer chip 20, the chip 20 will provide a high output to NPN transistor 40 through fixed resistor 42. At the same time, stage leads 25, 27, and 29 select the number of stages the timer chip 20 will go through. Since the stages are preselected, the RC network 22 will determine the frequency for an internal RC oscillator (not shown) of the timer chip, the speed with which the timer chip 20 will go through all the stages, and corresponding duration of the timer chip output at output lead 31. It is to be understood that the frequency of the RC oscillator may be varied by merely varying the resistance and/or capacitance of the RC network. It is also to be understood that a variable time interval may be achieved by providing the RC network with a variable resistor. Thus, the predetermined time interval may be either fixed (as shown) or variable.

Figure 3:
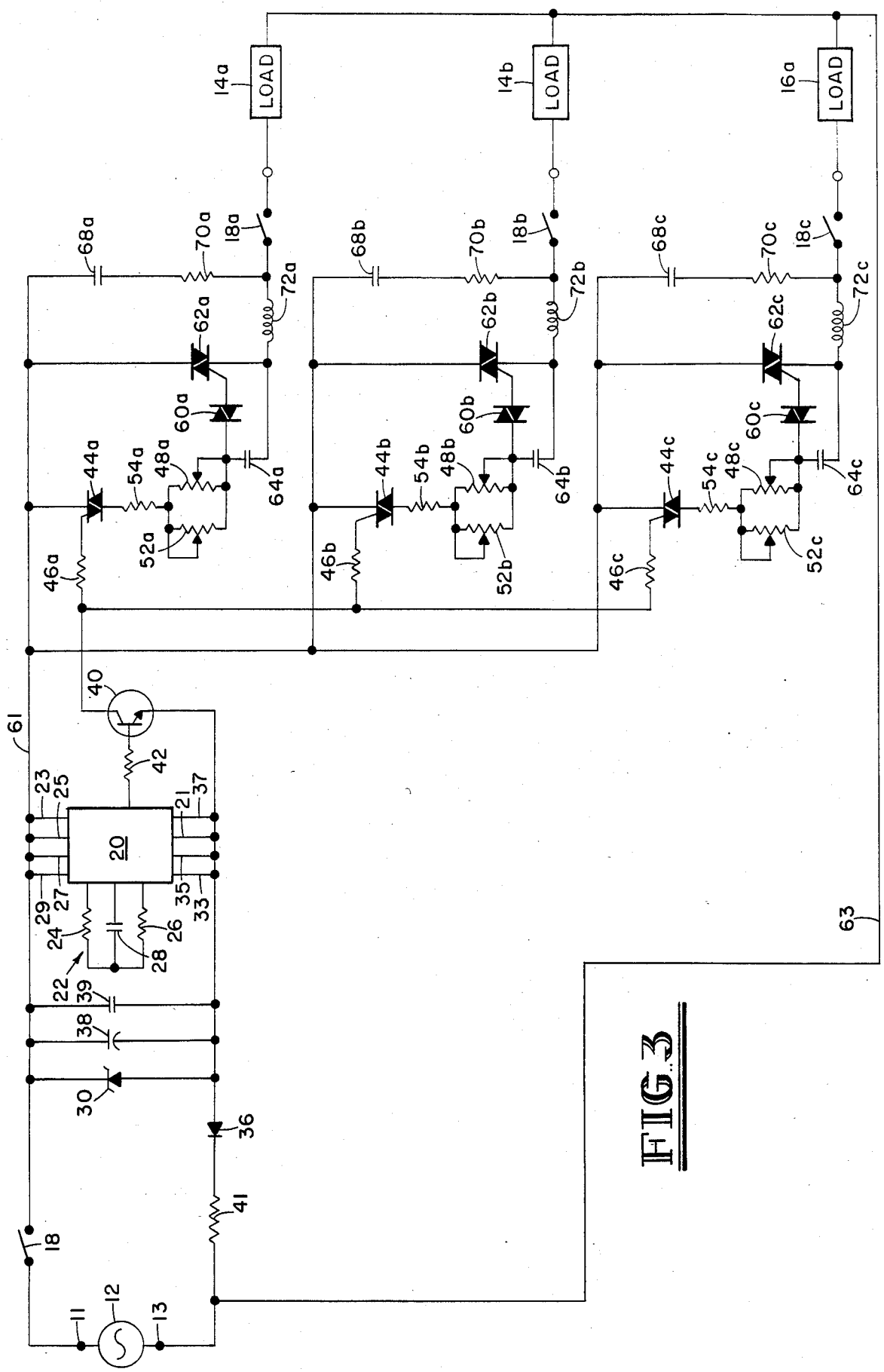
FIG. 3 is a schematic circuit diagram of a variable control circuit as utilized with a plurality of inductive and resistive loads, each further having a predetermined timed output.

Timer chip 20 will continue to bias transistor 40 for the duration of the predetermined time interval, thereby permitting the flow of rectified current to a logic triac 44 through fixed resistor 46. The rectified current flow to the timer chip 20 and logic triac 44 is achieved by rectifying the alternating current from AC voltage source 12. The rectification process is accomplished by means of a zener diode 30, series dropping resistors 32 and 34, rectifier diode 36, and an electrolytic capacitor 38. It is to be understood that dropping resistors 32 and 34 may be replaced by a single resistor 41, as illustrated in FIG. 3. The zener diode 30 regulates voltage drift and preferably has a voltage rating of 10 to 15 volts. Electrolytic capacitor 38 filters the pulsating current to essentially direct current for proper reception by timer chip 20 and logic triac 44. The timer chip 20 is thus connected between the current rectification components and the NPN transistor 40. Likewise, the transistor 40 is connected between the rectification components and the logic triac 44. Finally, the current rectification components are connected between the AC voltage source 12 and the timer chip 20, and between the AC voltage source 12 and the gate of the logic triac 44.

The rectified current flowing through NPN transistor 40 triggers the gate of logic triac 44, which is connected between a first side of the AC voltage source 12 and the variable control portion of the circuit, thereby permitting the flow of alternating current from AC voltage source 12 through the first and second terminals of logic triac 44. The alternating current from base voltage line 61 going through the terminals of logic triac 44 flows to a variable resistor 48 or 50. External input at variable resistor 48 or 50 allows the load user to control the resistance and corresponding current flow through variable resistors 48 or 50, respectively. The external input may be achieved in any conventional manner, such as by means of a knob, and allows the load user to choose the load output desired. As illustrated in FIG. 1, variable resistor 48 and fixed resistor 58 are used in series connection with gating/AC timing capacitor 64. Capacitor 64 is a phase shifting capacitor in which each time delayed half cycle is determined by the variable RC time constant. Variable resistor 48 is also provided with a trimmer resistor 52 for setting the voltage to be present at the variable speed motor 14 when the load user has set the motor 14 on its lowest speed. The trimmer resistor 52 has been eliminated in FIG. 2 and an intermediate phase shifting RC circuit resistor 54 and capacitor 56 have been placed between logic triac 44 and variable resistor 50.

As illustrated in FIG. 1, variable resistor 48 and series gating/AC timing capacitor 64 trigger a trigger diode or diac 60. The variable resistor 48 receives external input from the load user and controls the charging current to the capacitor 64; when the diac 60 breaks over, the capacitor 64 discharges through the diac 60 and supplies the current for the gate of triac 62. Thus, when sufficient voltage has accumulated at the capacitor 64, the diac 60 will fire and trigger or operate the gate of power control triac 62, thereby permitting the desired flow of current through its terminals. Since power control triac 62 is connected between a first side of AC voltage source 12 and a first side of AC load 14 or 16 between base voltage line 61 and control voltage line 63, it will control the power delivered to the load. Power control triac 62, therefore, is controlled by variable resistor 48 or 50 and allows the desired flow of current to pass between AC voltage source 12 and AC loads 14 or 16, respectively, thereby achieving the desired load output.

The invention circuit also may include an RFI suppression 66 connected between the base voltage line 61 and the control voltage line 63. The RFI may comprise a filter capacitor 68 connected in series with a current limiting resistor 70, as illustrated in FIG. 1, or a coil 72, as illustrated in FIG. 2. This series connection is necessary because of the inductance of the load 14 or 16 to give RFI filtering and to reduce RFI variations from the line voltage. The series connection of filter capacitor 68 and current limiting resistor 70 prevent "in-rush" current damage, provide dampening, and provide holding current for the triac 62 when light loads are being controlled.

During actual operation of the circuit, switch 18 will provide power to the load 14 or 16 from AC voltage source 12 and automatically reset timer chip 20, thereby initiating the predetermined time interval and completing the circuit. Switch 18 may be a SPDT switch between "OFF" contact point 17 and "ON" contact point 19, as illustrated in FIG. 1, further comprising a fixed switch resistor 15. Switch 18 may also be a SPST switch, as illustrated in FIG. 2, which opens or closes the invention circuit 10. Timer chip 20 will continue to bias NPN transistor 40 in response to rectified current from the AC voltage source 12 for the duration of the predetermined time interval, thereby permitting the activation of logic triac 44 by direct current. The logic triac 44 permits alternating current to flow through its terminals to the variable control portion of the circuit. As diac 60 receives the controlled current from variable resistor 48 or 50 and gating/AC timing capacitor 64 and is triggered thereby, it will operate the gate of power control triac 62 and permit the desired amount of power to flow through its terminals to loads 14 or 16, respectively. It is to be understood that the flow of current and corresponding load output is determined by the point at which the power control triac 62 is triggered.

When the predetermined time interval is completed, the output of timer chip 20 becomes low and it ceases to bias transistor 40, thereby prohibiting the flow of rectified current to logic triac 44 and prohibiting the flow of alternating current to the variable output control portion of the circuit. Likewise, when diac 60 ceases to be triggered by controlled current, it will not operate the gate of triac 62, and the desired flow of power between AC voltage source 12 and load 14 or 16 through the terminals of power control triac 62 will be inhibited. It is to be understood that although switch 18 is "ON" or closed at the termination of the predetermined time interval, the timer chip 20 will not be reset until switch 18 is turned "OFF" or opened and subsequently turned "ON" or reclosed. If an SPST switch 18 is utilized, as illustrated in FIG. 2, the reset will be delayed; that is, switch 18 must remain open for approximately 30 seconds before the predetermined time interval can be reinitiated by closing switch 18. If an SPDT switch 18 is utilized, as illustrated in FIG. 1, the time interval may be instantaneously reset by merely turning switch 18 "OFF" and "ON" again. In any event, electrolytic capacitor 38 must be discharged below approximately two volts before the circuit 10 will reset. Thus, the SPDT or SPST switch 18 functions to initiate and reset the predetermined time interval, thereby completing the invention circuit 10. It is also to be understood that the switch 18 and variable resistor 48 or 50 can be incorporated into a single external knob whereby the circuit may be turned "OFF" or "ON" and whereby infinite output control can be obtained.

The invention circuit 10 may be readily modified to accomodate an inductive or resistive AC load having a fixed output. This can be achieved by merely eliminating the variable resistor 48 (with accompanying trimmer resistor 52) or variable resistor 50, gating capacitors 64 and 56, and the diac 60 and replacing them with a "short". A delayed "turn-on" timer control can also be achieved by merely replacing the NPN transistor 40 with a PNP transistor.

As illustrated in FIG. 3, the invention circuit 10 described hereinabove may be readily modified to accomodate a plurality of resistive and/or inductive loads. For example, the circuit illustrated in FIG. 3 may be utilized in a bed comprising a pair of vibrator motors 14a and 14b, and a heating pad 16a. Furthermore, the current flow to loads 14a, 14b, and 16a may be independently controlled, thereby permitting independent control of load output. For example, the output of vibrator motor 14a may be high, the output of vibrator motor 14b may be low, and the output of heating pad 16a may be intermediate.

The circuit illustrated in FIG. 3 is provided with an additional capacitor 39. Loads 14a, 14b, and 16a are also provided with independent switches 18a, 18b, and 18c, respectively. The master switch 18 determines current flow to the entire circuit; independent switches 18a, 18b, and 18c determine current flow to the respective loads.

Figure 4:
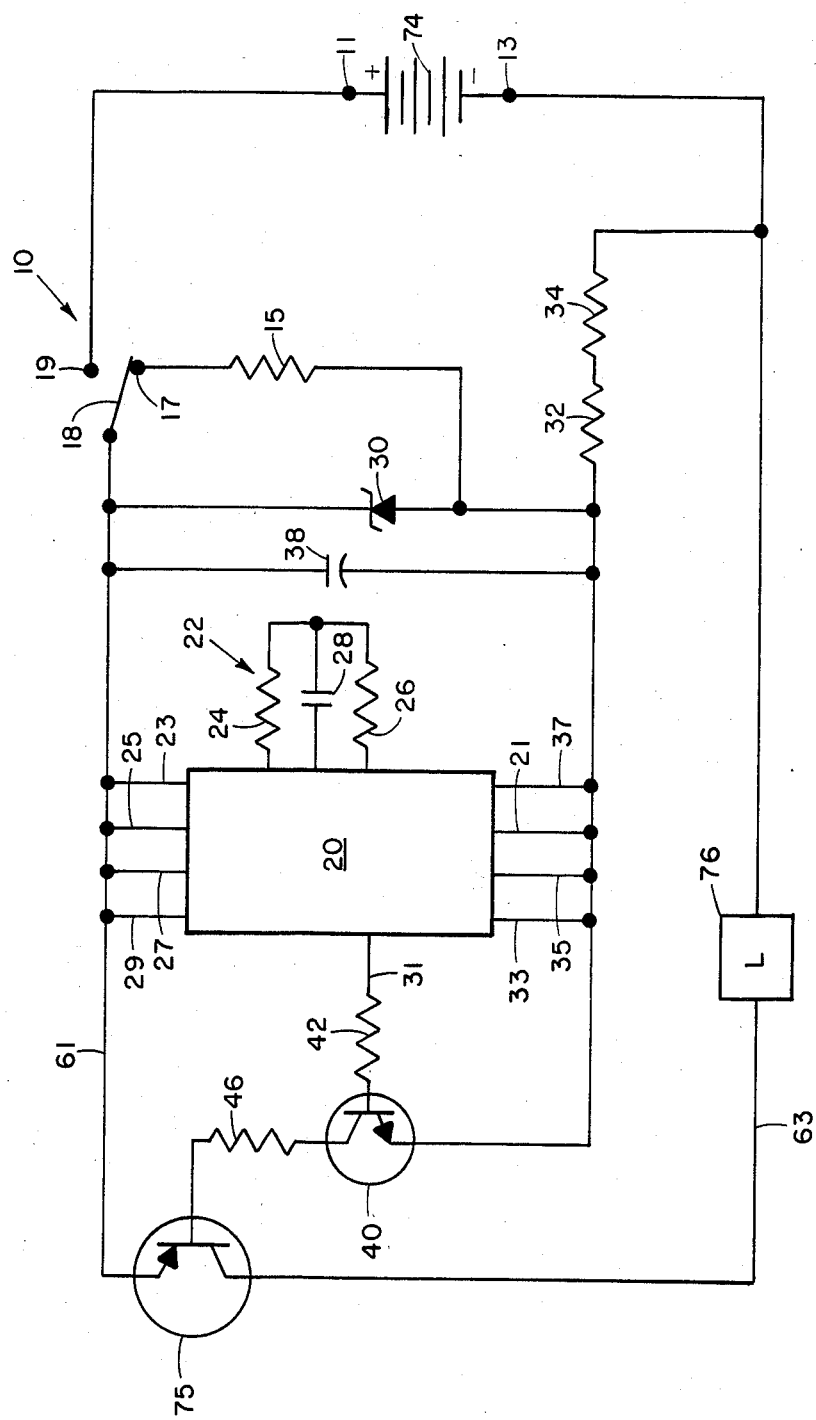
FIG. 4 is a schematic circuit diagram of a variable control circuit for varying current flow to a DC load further having a predetermined timed output.

As illustrated in FIG. 4, the invention circuit 10 may also be readily modified to accomodate a DC load 76 having a fixed output. This is accomplished by the addition of a PNP transistor 75 between the DC power supply 74 and the DC load 76. The NPN transistor 40 will bias PNP transistor 75 for the duration of the predetermined time interval, thereby permitting current flow to the load 76 and the corresponding fixed output. Current flow and the corresponding output will thereafter cease at the termination of the predetermined time interval.

The invention circuit as described herein is able, therefore, to vary the current to a resistive or inductive load and, simultaneously, limit the desired load output to a predetermined time interval. The invention circuit also permits independent control of the variable load output regardless of the time interval, whether it is fixed or variable. Finally, the invention circuit is able to achieve the results described herein in a single circuit board without the assistance of a mechanical timer.

While the invention variable control circuit having a predetermined timed output has been described in connection with the preferred embodiment, it is not intended to limit the invention to the particular form set forth, but on the contrary, it is intended to cover such alternatives, modifications, and equivalents as may be included within the spirit and scope of the invention as defined by the appended claims.

I claim:

1. A circuit for connection across an AC voltage source to permit current flow to a load and, simultaneously limit said current flow and corresponding output of said load to a predetermined time interval, said circuit comprising:

first switch means connected between a first side of said AC voltage source and a first side of said load, a second side of said load being connected to a second side of said AC voltage source, said first switch means having a gate permitting said current flow to said load upon triggering thereof by rectified current;

current rectification means connected between said AC voltage source and said first switch means;

transistor means connected between said current rectification means and said first switch means;

transistor biasing means connected between said transistor means and said current rectification means for biasing said transistor for said predetermined time interval in response to rectified current from said current rectification means, thereby allowing said rectified current to flow to and trigger said gate of said first switch means for said predetermined time interval;

variable power control means connected between said transistor means and said gate of said first switch means, said power control means providing infinitely variable control of power output through said first switch means; and second switch means for providng a positive ON and OFF connection by said AC voltage source to said circuit and for initiating said predetermined time interval, said second switch means connected to an off-state load in the OFF position thereby positively interrupting said predetermined time interval if said predetermined time interval has not expired when said second switch means is switched to OFF.

2. A circuit for connection across an AC voltage source to permit controlled current flow to a load and, simultaneously, limit said controlled current flow and corresponding output of said load to a predetermined time interval, said circuit comprising:

first switch means connected between a first side of said AC voltage source and a first side of said load, a second side of said load being connected to a second side of said AC voltage source, said first switch means having a first gate permitting said controlled current flow to said load upon triggering thereof;

means for controlling said triggering of said first gate of said first switch means, thereby permitting said controlled current flow to said load, said means for controlling including:

second switch means connected between said first side of said AC voltage source and a first side of said triggering control means, said second switch means having a second gate permitting current flow between said AC voltage source and said triggering control means upon triggering of said second gate by rectified current;

current rectification means connected between said AC voltage source and said second switch means;

transistor means connected between said current rectification means and said second switch means;

transistor biasing means connected between said transistor means and said current rectification means for biasing said transistor for said predetermined time interval in response to rectified current from said current rectification means, thereby allowing said rectified current to flow to and trigger said second gate of said second switch means for said predetermined time interval, said triggering control means responding to said current flow by permitting said triggering of said first gate, thereby permitting said controlled current flow to said load;

variable power control means connected between said second switch means and said gate of said first switch means, said power control means providing infinitely variable control of power output through said first switch means; and means for initiating said predetermined time interval, thereby to permit said controlled current flow to said load for said predetermined time interval.

3. A circuit for connection across an AC voltage source, as recited in claims 1 or 2, wherein said transistor biasing means is a timer clip having an external RC network and wherein said predetermined time interval is determined by said RC network.

4. A circuit for connection across an AC voltage source, as recited in claims 1 or 2, wherein said predetermined time interval is fixed.

5. A circuit for connection across an AC voltage source, as recited in claims 1 or 2, wherein said predetermined time interval is variable.

6. A circuit for connection across an AC voltage source, to permit controlled current flow to a load and, simultaneously, limit said controlled current flow and corresponding output of said load to a predetermined time interval, said circuit comprising:

first switch means connected between a first side of said AC voltage source and a first side of said load, a second side of said load being connected to a second side of said AC voltage source, said first switch means having a first gate permitting said controlled current flow to said load upon triggering thereof;

means for controlling said triggering of said first gate of said first switch means, thereby permitting said controlled current flow to said load, said means for controlling including; second switch means connected between said first side of said AC voltage source and a first side of said triggering control means, said second switch means having a second gate permitting current flow between said AC voltage source and said triggering control means upon triggering of said second gate by rectified current;

current rectification means connected between said AC voltage source and said second switch means;

transistor means connected between said current rectification means and said second switch means;

transistor biasing means connected between said transistor means and said current rectification means for biasing said transistor for said predetermined time interval in response to rectified current from said current rectification means, thereby allowing said rectified current to flow to and trigger said second gate of said second switch means for said predetermined time interval, said triggering control means responding to said current flow by permitting said triggering of said first gate, thereby permitting said controlled current flow to said load;

means for initiating said predetermined time interval, thereby to permit said controlled current flow to said load for said predetermined time interval; and a disc and a variable resistor in series connection with a gating/AC timing capacitor, said variable resistor and said capacitor permitting a desired flow of current from said AC voltage source through said second switch to said diac and said variable resistor controlling said charging current from said AC voltage to said capacitor, said capacitor discharging current through said diac when said capacitor has accumulated sufficient voltage, said charging current thereby triggering said first gate.

7. A circuit for connection across an AC voltage source, as recited in claim 6 wherein said transistor biasing means is a timer chip having an external RC network and wherein said predetermined time interval is determined by said RC network.

8. A circuit for connection across an AC voltage source, as recited in claim 6, wherein said predetermined time interval is fixed.

9. A circuit for connection across an AC voltage source, as recited in claim 6, wherein said predetermined time interval is variable.

10. A circuit for connection across an AC voltage source to permit current flow to a load and, simultaneously, limit said current flow and corresponding output of said load to a predetermined time interval, said circuit comprising:

switch means connected between a first side of said AC voltage source and a first side of said load, a second side of said load being connected to a second side of said AC voltage source, said switch means having a gate permitting said current flow to said load upon triggering thereof by rectified current;

current rectification means connected between said AC voltage source and said switch means;

transistor means connected between said current rectification means and said switch means;

transistor biasing means connected between said transistor means and said current rectification means for biasing said transistor for said predetermined time interval in response to rectified current from said current rectification means, thereby allowing said rectified current to flow to and trigger said gate of said switch means for said predetermined time interval;

means for initiating said predetermined time interval, thereby to permit said current flow to said load for said predetermined time interval; and a plurality of said switch means each with separate gates and separate loads, said plurality of said switch means, gates and loads being connected in parallel and said plurality of switch means being simultaneously triggered for said predetermined time interval.

11. A circuit for connection across an AC voltage source as recited in claim 10 further comprising separate switches in series within each of said parallel connections to disengage any of said separate loads from said circuit.

* * * * *